(12) United States Patent
Ahle

(10) Patent No.: US 11,919,466 B2
(45) Date of Patent: Mar. 5, 2024

(54) PASSENGER RESTRAINT DEVICE AND FAIRGROUND RIDE PASSENGER UNIT

(71) Applicant: HAWE Hydraulik SE, Aschheim (DE)

(72) Inventor: Alexander Ahle, Worth an der Donau (DE)

(73) Assignee: HAWE Hydraulik SE, Aschheim (DE)

( * ) Notice: Subject to any disclaimer, the term of this patent is extended or adjusted under 35 U.S.C. 154(b) by 792 days.

(21) Appl. No.: 17/072,558

(22) Filed: Oct. 16, 2020

(65) Prior Publication Data

US 2021/0114542 A1 Apr. 22, 2021

(30) Foreign Application Priority Data

Oct. 18, 2019 (DE) ...................... 10 2019 216 083.2

(51) Int. Cl.
    *A63G 7/00* (2006.01)
    *B60R 21/02* (2006.01)
    *A63G 31/00* (2006.01)
    *F15B 15/20* (2006.01)

(52) U.S. Cl.
    CPC ................ B60R 21/02 (2013.01); *A63G 7/00* (2013.01); *A63G 31/00* (2013.01); *B60R 2021/0213* (2013.01); *B60R 2021/028* (2013.01); *F15B 15/202* (2013.01); *F15B 15/204* (2013.01)

(58) Field of Classification Search
    CPC ........ F15B 15/204; F15B 15/202; A63G 7/00; A63G 31/00; B60R 21/02
    See application file for complete search history.

(56) References Cited

U.S. PATENT DOCUMENTS

| 9,944,375 B1* | 4/2018 | Martin | ................ F15B 15/1447 |
|---|---|---|---|
| 11,007,960 B1* | 5/2021 | Syrcle | ...................... A63G 7/00 |
| 11,465,062 B2* | 10/2022 | Ahle | ........................ A63G 7/00 |
| 2019/0224794 A1* | 7/2019 | Luthi | ...................... B25B 5/006 |

(Continued)

FOREIGN PATENT DOCUMENTS

| CN | 105555617 A | 5/2016 |
|---|---|---|
| CN | 106194584 A | 12/2016 |

(Continued)

OTHER PUBLICATIONS

The State Intellectual Property Office of People's Republic of China, First Office Action issued in corresponding China application No. 202011119211.9, dated Jan. 29, 2022, 19 pp.

*Primary Examiner* — Syed A Islam

(74) *Attorney, Agent, or Firm* — DINSMORE & SHOHL LLP

(57) ABSTRACT

A passenger restraint device of a fairground ride passenger unit, which has a passenger space, includes a position-adjustable restraint element and a lockable hydraulic adjuster which acts on the restraint element and has a cylinder-piston unit and a hydraulic accumulator. The hydraulic accumulator and the cylinder-piston unit of the hydraulic adjuster form a structural unit in that the cylinder of the cylinder-piston unit and a cylinder of the hydraulic accumulator arranged next to and parallel to the cylinder are part of an integrated cylinder assembly. The integrated cylinder assembly has a connection block with a switching plate on an axial end face, wherein the hydraulic accumulator is configured as a single unit and is detachably mounted on the switching plate.

19 Claims, 5 Drawing Sheets

(56) References Cited

U.S. PATENT DOCUMENTS

| | | | | |
|---|---|---|---|---|
| 2019/0271332 A1* | 9/2019 | Todsen | ................ | F15B 15/1457 |
| 2021/0270295 A1* | 9/2021 | Syrcle | ..................... | F16J 1/008 |
| 2021/0317850 A1* | 10/2021 | Takakuwa | ............. | F15B 15/204 |

FOREIGN PATENT DOCUMENTS

| | | |
|---|---|---|
| CN | 106194584 B | 3/2020 |
| DE | 3237684 A1 | 4/1983 |
| DE | 202006016451 U1 | 3/2008 |
| DE | 10 2014 013 018 A1 | 3/2016 |
| DE | 20 2016 003 163 U1 | 6/2016 |
| GB | 846307 A | 8/1960 |
| WO | 2019229183 A1 | 12/2019 |

* cited by examiner

PASSENGER RESTRAINT DEVICE AND FAIRGROUND RIDE PASSENGER UNIT

CROSS-REFERENCE TO RELATED APPLICATION

This application claims priority from Application No. DE 10 2019 216 083.2 filed Oct. 18, 2019, the entire content of which is incorporated herein by reference.

FIELD OF THE INVENTION

This invention relates to a passenger restraint device for a fairground ride passenger unit. In particular, the present invention relates to a passenger restraint device, wherein the passenger restraint device comprises a position-adjustable restraint element and a lockable hydraulic adjuster acting thereon, which in turn comprises a cylinder-piston unit and a hydraulic accumulator. Further, the present invention relates to a fairground ride passenger unit having a passenger space and a passenger restraint device according to the present invention.

BACKGROUND OF THE INVENTION

For safety reasons, passenger restraint devices are provided in particular for rides used for the amusement of persons, in which very considerable forces or accelerations are exerted on the persons concerned (passengers), by means of which the passengers are fixed to the passenger space occupied by them in such a way that they cannot leave this passenger space (seat, lying surface, standing area, etc.). Depending on the individual ride, the passenger restraint device also further restricts the passenger's freedom of movement (immobilization). According fairground ride passenger units and passenger restraint devices are for instance known from DE 32 37 684 A1.

Common restraint elements are, for example, restraining brackets which are used to fix the passenger on the shoulders, chest, back, belly, hips and/or legs. Such restraining brackets or other restraint elements may, in particular, be pivotally attached to the structure of the passenger unit, which also includes the passenger space, in such a way that they can be locked in several different positions to adapt to the individual height of the passenger concerned.

Conventional locking systems used comprise ratchets or comparable mechanical locking gears. For hydraulic locking elements that are already in use, the locking function is typically based on the fact that hydraulic fluid is tightly locked in a hydraulic cylinder working chamber, the volume of which changes with the position of the restraint element. This allows the restraint element to be infinitely locked in different positions. The hydraulic cylinder may be part of a hydraulic adjuster which, in addition to the blocking or locking function for the restraint element, has a further function in that it is suitable and designed for actively opening the restraint element after it has been unlocked. In this way, the restraining brackets or other restraint elements can be opened simultaneously and without any action on the part of the passengers in all passenger units of the fairground ride by the assigned adjusters, which makes a quick and smooth passenger change possible. In addition to the—then typically double-acting—hydraulic cylinder, the adjuster also comprises a hydraulic accumulator. The hydraulic accumulator stores hydraulic fluid under pressure and is charged by hydraulic fluid displaced from the hydraulic cylinder when the restraint element is closed. When the valve is in the appropriate position the hydraulic cylinder is pressurized via the hydraulic accumulator in the reverse direction of flow in the sense of opening the restraint element.

SUMMARY OF THE INVENTION

The problem solved by the present invention is to provide a further improvement of the above-mentioned state of the art in terms of safety and to provide a particular compact and flexible passenger restraint device for up fairground ride passenger unit.

The passenger restraint device according to the invention is characterized in that the hydraulic accumulator and the cylinder-piston unit of the hydraulic adjuster form a structural unit in that the cylinder of the cylinder-piston unit and a cylinder of the hydraulic accumulator arranged next to and parallel to it are part of an integrated cylinder assembly which comprises a connection block with the switching plate on one of the axial end faces. According to the invention, the hydraulic accumulator is configured as a single unit which is detachably mounted on the switching plate.

According to the invention, passenger restraint devices can be realized in which the hydraulic adjuster is absolutely compact despite the provision of high locking forces. One of the factors here is that the hydraulic accumulator has a cylinder extending parallel to the cylinder of the cylinder-piston unit and at least substantially over its entire length. This allows the hydraulic accumulator to be comparatively slim. Thanks to its compact design, the hydraulic adjuster can be ideally accommodated within the passenger unit in terms of safety, i.e. in a place where it is optimally protected from damage. Due to both its small size and the possibility of optimal accommodation the risk of injury to the passenger is minimized. The possibility of comparatively closed construction, i.e. the absence of protruding parts and/or gaps in which objects can get caught, also contributes to this. Further, different hydraulic accumulators can flexibly be used depending on the respective requirement. For example, in case the passenger restraint device is configured to move a bail for a hip the hydraulic accumulator can be smaller than a respective one used for moving a massive bail for her shoulder.

Furthermore, the hydraulic adjuster of the passenger unit according to the invention is particularly suitable for a modular design due to its structural features. For example, mirror-image adjusters can be made available with very little effort. The same applies to adjusters which differ only with regard to the piston locking direction (i.e. locking against retraction or against extension of the piston rod with free movement in the opposite direction), but which are otherwise identical. Furthermore, due to this, it is possible to retrofit from one version to another by simple and uncomplicated adaption of the adjusters.

Preferably, the hydraulic accumulator is detachably mounted on the switching plate via a threading. This allows for an easy and fast mounting of the hydraulic accumulator on the switching plate. Furthermore, this facilitates maintenance works, as the hydraulic accumulator can easily be detached if necessary.

Preferably, the cylinder assembly comprises a portion of an extruded double-tube profile. The cylinder-piston unit and the cylinder of the hydraulic accumulator are mutually stiffened, so that the cylinder-piston unit can withstand without damage even when subjected to particularly strong or violent mechanical stresses, and this at a particularly low weight, which in turn proves to be very advantageous in view of the sometimes very considerable acceleration forces to which the elements of the passenger restraint device are exposed.

In this regard, the hydraulic accumulators is preferably guided in a tube portion of the double-tube profile. Preferably, the tube portion overlaps the hydraulic accumulator at least partially in the radial direction. Thus, damage to the hydraulic accumulator can reliably be prevented, as tilting in the area of the threading is prevented.

The hydraulic accumulator used by the hydraulic adjuster of the invention passenger unit—as part of an integrated cylinder assembly also comprising the cylinder of the cylinder-piston unit—may be designed as a spring accumulator in the preferred configuration in such a way that the hydraulic fluid stored in its cylinder is kept under pressure by means of a spring, the hydraulic chamber storing the hydraulic fluid and the spring chamber containing the spring being separated from each other by a separating element. As a spring, various devices can be considered which are suitable for absorbing, storing and releasing energy. If the spring is realized by a mechanical spring (e.g. coil spring), the separating element is preferably designed as a piston. Even if the spring is realized by a gas spring, the separating element is preferably formed by a piston. This means that the comparatively elongated design of the hydraulic accumulator can be used to optimum effect as a result of its particularly slim cylinder (see above). Alternatively, however, it may be advantageous if an elastically flexible bladder filled with the pressurized spring gas is accommodated inside the cylinder of the hydraulic accumulator.

To allow for a particularly low weight, but in particular also because of a very advantageous operating characteristic of the adjuster, it is also preferable if the hydraulic accumulator comprises a gas spring. The spring space preferably delimited by a piston or a bladder arrangement accommodates a compressed gas filling in a gas-tight manner, the gas spring having the further advantage that its operating characteristic is only minimally influenced by the changing position or orientation in the space and/or the strongly and rapidly changing kinetic conditions.

Preferably, the spring space is configured as a gas chamber filled with spring gas, wherein the hydraulic accumulator comprises an integrated filling connection for filling the gas chamber with spring gas. In this regard it is further preferable that the filling connection comprises a two-stage sealing. The two-stage sealing is in particular provided in form of a check valve and as screw plug. This allows for an easy, safe and fast filling of the spring space with spring gas. Further, this allows for a precise adjustment of the set gas pressure in the gas chamber (and the maintenance of the set gas pressure), which is a decisive factor in adapting the hydraulic adjuster to the respective application environment.

Preferably, the switching plate comprises a line and valve arrangement hydraulically interconnecting the hydraulic accumulator with the cylinder-piston unit. Preferably, the switching plate further comprises an electrical switching interface. If the hydraulic accumulator is designed as a spring accumulator, in particular as a gas-spring piston accumulator or gas-spring bladder accumulator, the hydraulic chamber of the hydraulic accumulator is particularly preferred to be adjacent to the switching plate and the spring chamber of the hydraulic accumulator is located at a distance from the switching plate. In particular, the cylinder-piston unit can be configured as a differential cylinder and, in an unlocked floating position, both a piston working chamber and a piston rod working chamber of the differential cylinder can be pressurized from the hydraulic accumulator via the line and valve arrangement. The fact that in this case only the differential volume is exchanged with the hydraulic accumulator further favors the possibility of a particularly compact design of the hydraulic adjuster.

The above-mentioned line and valve arrangement accommodated in the switching plate preferably comprises at least one check valve which in a safety position allows flow from the piston working space of the differential cylinder to its piston rod working space, but prevents flow in the opposite direction. The restraint element can thus be operated intuitively by manually moving it towards the passenger's body until it is securely fixed, and the restraint element then easily remains in this position due to the said check valve operating in the safety position. Such intuitive operation is also an important aspect that promotes safety. Particularly advantageous are those line and valve arrangements in which the safety function described is guaranteed by exactly one, i.e. a single, check valve, not only in terms of costs and installation space, but also in terms of safety.

Preferably, the differential cylinder comprises a piston rod and the line and valve arrangement comprises a check valve arrangement which, in a blocking position with the piston rod of the differential cylinder being extended, locks hydraulic fluid in the differential cylinder. In this case, in its fully open—and blocked—position, the restraint element is suitable as a boarding and/or alighting aid to provide the passenger with support. Accidents that were caused in the past by a passenger reaching for the restraining bracket or other restraint element when getting on or off the passengers space in the belief that it was making a stop, but giving way to it, can thus be avoided.

Another preferred further embodiment of the present invention is characterized by the fact that the adjuster comprises a piston position sensor. A piston position signal generated by the piston position sensor can be evaluated in various ways in an electronic circuit communicating with the piston position sensor via a control interface such as a SPI bus. In particular, the direct monitoring of the piston of the cylinder-piston unit of the adjuster by means of the piston position sensor and an evaluation circuit to determine whether its position within the cylinder remains the same or changes is a further substantial increase in safety. A (slight) leakage of the valve causing the locking of hydraulic fluid in the cylinder-piston unit can lead to a creeping piston movement; while this remains undetected in the case of monitoring the switching position of the valve concerned, the direct monitoring of the piston position by means of a piston position sensor described above is able to identify this safety deficiency immediately.

A preload of the adjuster implemented by the hydraulic accumulator and acting in the sense of opening the restraint element causes the piston to move in a defined manner by the cylinder-piston unit of the adjuster in the event of a malfunction of the locking function of the adjuster, which is conducive to the reliable, safe detection of such a malfunction by evaluating piston position signals. Appropriate measures can be taken to ensure that deliberate manipulation (in particular by holding the restraint element) is impossible.

In a particularly preferred embodiment, the piston position sensor has a spindle extending parallel to the cylinder axis and mounted so as to be axially fixed but rotatable relative to the cylinder, with a threaded section extending into in a cavity of the piston and/or piston rod and having a steep thread, which interacts with a corresponding spindle nut arranged on the piston. An axial movement of the piston causes the spindle to rotate. By means of a sensor, which is preferably configured as a non-contact rotary encoder, such rotation of the spindle is detected. A change in the piston position can thus be reliably detected by means of a particularly compact device.

Preferably, the spindle has two parts with a main part comprising the threaded section and an end piece connected to the main part. In particular, an inner ring of a roller bearing running under oil is fixed in a transition region between the main part in the end piece. Preferably, the outer ring of the roller bearing is disposed in a bearing insert, wherein the bearing insert is disposed in a bore of a base part of the cylinder of the cylinder-piston unit and sealed against the bore of the base part and the end piece of the spindle by means of two sealing rings. This allows for particular compact configuration.

The evaluation circuit preferably is a structural component of the adjuster, but can also be provided remotely if necessary and can, but does not necessarily have to constantly determine the absolute position of the piston relative to the cylinder of the cylinder-piston unit. Rather, it is sufficient to limit oneself to monitoring only a possible movement of the piston relative to the cylinder of the cylinder-piston unit independent of the respective absolute position; and also such a movement monitoring can be limited to certain times or time ranges within the respective operating cycle of the fairground ride, whereby an evaluation can be omitted particularly during the passenger change. Monitoring aimed at detecting piston movements takes account of the fact that the individual position in which the restraint element must remain fixed by the adjuster during the relevant travel cycle may change from travel cycle to travel cycle because, for example, it depends on the body dimensions of the passenger concerned. The information as to whether and if so how (during the evaluation cycle or the evaluation phases) the piston of the cylinder-piston unit moves relative to its cylinder or not can be derived in various ways from the piston position signal, such as by comparison of clocked piston position signals, by determining the piston speed by differentiation (derivation) of the continuously detected piston position signal after time, by determining the piston acceleration by double differentiation (derivation) of the continuously detected piston position signal after time, or the like.

The evaluation of the piston position signal may also refer to the direction of movement of the piston relative to the cylinder of the cylinder-piston unit—in particular via the direction of rotation of the above-mentioned spindle—if necessary; a further pulling of the restraint element by the passenger to his body in order to ensure an even better fixation in or at the passenger seat is to be judged fundamentally differently from a movement of the restraint element in the opposite direction, i.e. a (creeping) opening of the restraint element.

If, however, the evaluation circuit not only determines possible movements of the piston of the cylinder-piston unit during operation of the ride, but also processes information on the absolute position of the piston, it is possible—as an additional safety aspect—to check whether the respective restraint element in all passenger units of the fairground ride is in a closed position at the beginning of the respective ride cycle (within a bandwidth taking into account the typical body dimensions of passengers).

According to another preferred embodiment of the invention, the piston position sensor communicates with an operating data memory in such a way that piston position signals are stored there and can be retrieved. In accordance with a preferred embodiment, the operating data memory is a structural part of the respective adjuster. However, a central operating data memory may also be considered, in which the operating data of several adjusters of the respective fairground ride are stored. From the data stored in the operating data memory, for example, the individual number of uses of the respective passenger unit can be recorded. This allows service, maintenance and care work to be carried out on the individual passenger unit depending on the intensity of use, which is advantageous both from the point of view of costs and safety. On the one hand—due to the consideration of the actual intensity of use—it is not necessary to carry out service, care and maintenance work as a precautionary measure triggered by a theoretical maximum use of the respective passenger unit. On the other hand, there is no risk of the necessary work being delayed beyond the time scheduled in the maintenance plan—based on a theoretical maximum use—by the ride operator, convinced that this was justified by a significantly lower actual use of the passenger unit than the theoretical maximum use.

Furthermore, the problem is solved with a fairground ride passenger unit according to claim 17. Preferably, the fairground ride passenger unit comprises a passenger space and the passenger restraint device as described above.

Further advantageous aspects and features result from the following explanation of preferred embodiments.

BRIEF DESCRIPTION OF THE DRAWINGS

In the following, this invention will be explained in more detail using two preferred embodiments illustrated in the drawing. Thereby

DETAILED DESCRIPTION OF THE INVENTION

Figure 1:
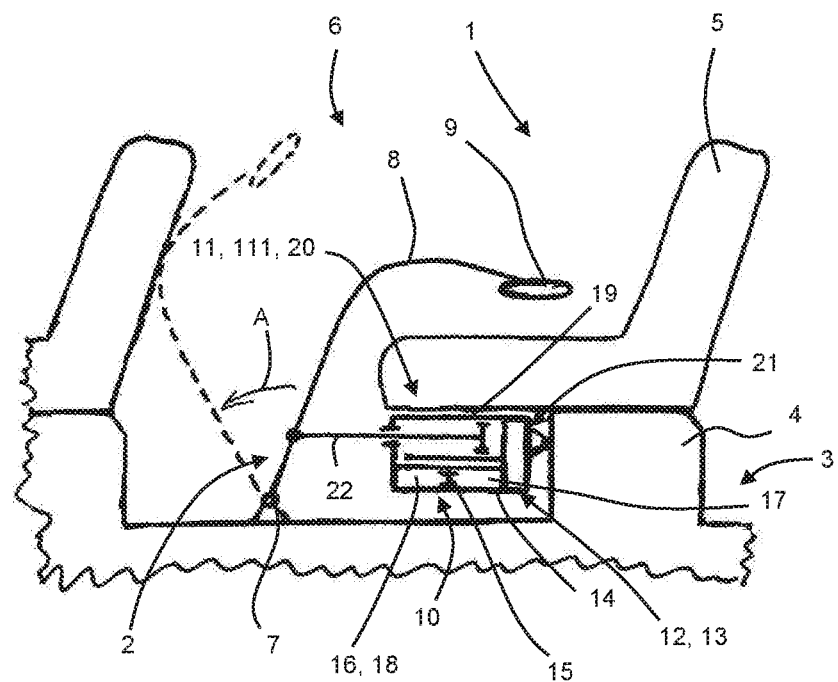
FIG. 1 is a basic representation of a fairground ride passenger unit according to the present invention.

The fairground ride passenger unit illustrated only schematically in FIG. 1 comprises a passenger space 1 and a passenger restraint device 2. The passenger space 1 is designed as a seat 5 mounted on a base structure 3 of the fairground ride, namely a seat carrier 4. And the passenger restraint device 2 comprises a position-adjustable restraint element 6 in the form of a restraining bracket 8 pivotably mounted on the base structure 3 of the ride at a joint 7 (cf. arrow A) with a padded pressure plate 9, by means of which a passenger seated on the seat 5 is fixed on the seat 5 at the thighs near the hip.

A lockable hydraulic adjuster 10 acts on the restraining bracket 8. It comprises a cylinder-piston unit 11, 11 and a hydraulic accumulator 12. The hydraulic accumulator 12 is configured as a single unit inform offer a spring-piston accumulator 13. It comprises a cylinder 14 with a sealingly guided free piston 15, which separates a spring chamber 16 from a hydraulic chamber 17 within the cylinder 14, whereby the spring is configured as a gas spring in this embodiment and the spring chamber 16 is thus configured as a gas chamber 18. The cylinder 19 of the cylinder-piston unit 11, 111, which is configured as a differential cylinder 20, is arranged next to the cylinder 14 of the spring-loaded piston accumulator 13 and parallel to it. The spring-loaded piston accumulator 13 and the cylinder-piston unit 11, 111 form a structural unit in that the cylinder 19 of the cylinder-piston unit 11 and the cylinder 14 of the spring-loaded piston accumulator 13 are part of an integrated cylinder assembly 21. The piston rod 22 of the cylinder-piston unit 11, 111 is hinged to the restraining bracket 8. Opposite the cylinder assembly 21 is mounted to the seat carrier 4.

The spring chamber 16 is sealed at the end with a special seal, gas-tight even against high gas pressures. For this purpose, the seal comprises a filling connection 77 serving to fill the spring chamber 16 (or the gas chamber 18) with spring gas. The filling connection 77 (see FIG. 2) is characterized by a two-stage sealing. A check valve 79, for which the insert 81 pressed into the filling nozzle 80 is only partially indicated, forms a primary sealing element 82. And a secondary sealing element 83 is formed by a screw plug 84. The function of the hydraulic adjuster 10 benefits from this particularly reliable sealing, because the precise adjustment of the gas pressure in the spring chamber 16 (and the maintenance of the set gas pressure) is a decisive factor in adapting the hydraulic adjuster to the respective application environment. A filling connection comparable to the gas side is provided on the oil side 85, not shown in FIG. 2.

Figure 2:
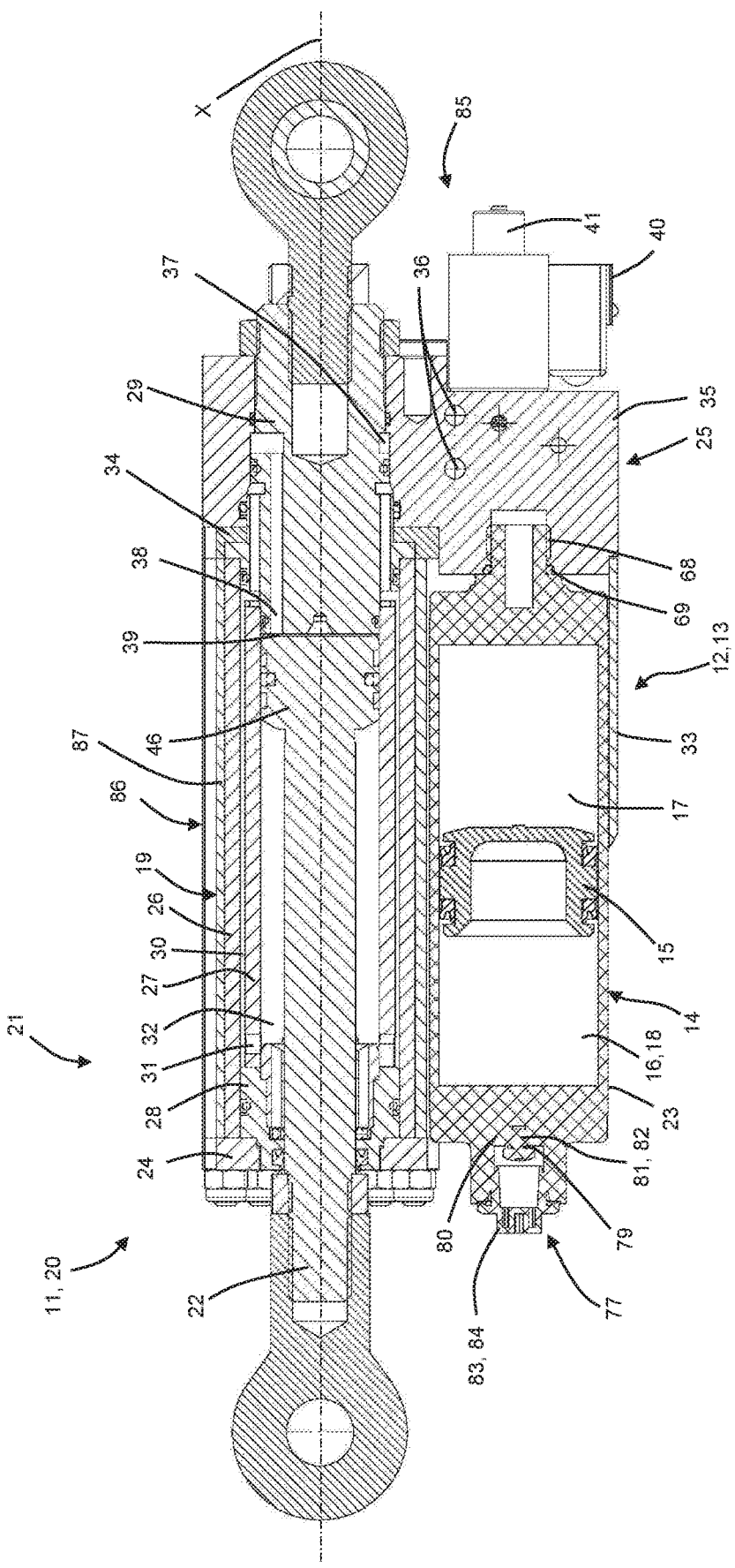
FIG. 2 is a detailed cross section of the hydraulic adjuster used on the passenger restraint device according to a first embodiment.

Details of cylinder assembly 21 according to a first embodiment are shown in FIG. 2. The cylinder 14 of the spring-loaded piston accumulator 13 is defined by a cylinder housing 23 which is detachably mounted on a switching plate 35 of a connection block 25. As shown, the cylinder housing 23 is detachably mounted on the switching plate 35 by means of a threading 68 and the seal member 69, so that the entire hydraulic accumulator 12 can be mounted on the switching plate 35 or detached therefrom as a single unit. The cylinder assembly 21 further comprises a portion of an extruded double-tube profile 86. Furthermore, the cylinder housing 23 is guided in a tube portion 33 of the extruded double-tube profile 86, which encloses the cylinder housing 23 radially. The connection block 25 extends over an end face of cylinder 19 of cylinder-piston unit 11. The cylinder 19 of the cylinder-piston unit 11 is partially composed by a further tube portion 87 of the double-tube profile 86 and is further of double-tube design with an outer tube 26 and an inner tube 27, a head part 28 and a bottom part 29, whereby there is an annular space 30 between the inner tube 27 and the outer tube 26, which communicates with a piston rod working space 32 via bores 31 of the inner tube 27, the piston working space 32 being defined by a piston 46 of the piston rod 22. Furthermore, a closure cover 24 is provided at the side of the head part 28.

The connection block 25 comprising the switching plate 35 further comprises an end plate 34. The cylinder 19 of the cylinder-piston unit 11 is fixed between the closure cover 24 and the end plate 34. The entire unit is clamped by means of tie rods.

The switching plate 35 comprises an integrated line and valve arrangement that hydraulically connects the hydraulic chamber 17 of the hydraulic accumulator 12 with the cylinder-piston unit 11. The channels 36 of the line and valve arrangement communicate via corresponding transfers 37 with channels 38 provided in the bottom part 29, the bottom part 29 penetrating the switching plate 35, and the channels 38 lead into the piston working chamber 39 or the annular chamber 30 respectively, wherein the piston working space 39 is separated from the piston rod working space 32 by means of the piston 46. The switching plate 35 also has an electrical switching interface 40, via which the switching solenoids 41 of the switching valves integrated in the line and valve arrangement (see FIG. 3) can be controlled.

Figure 3:
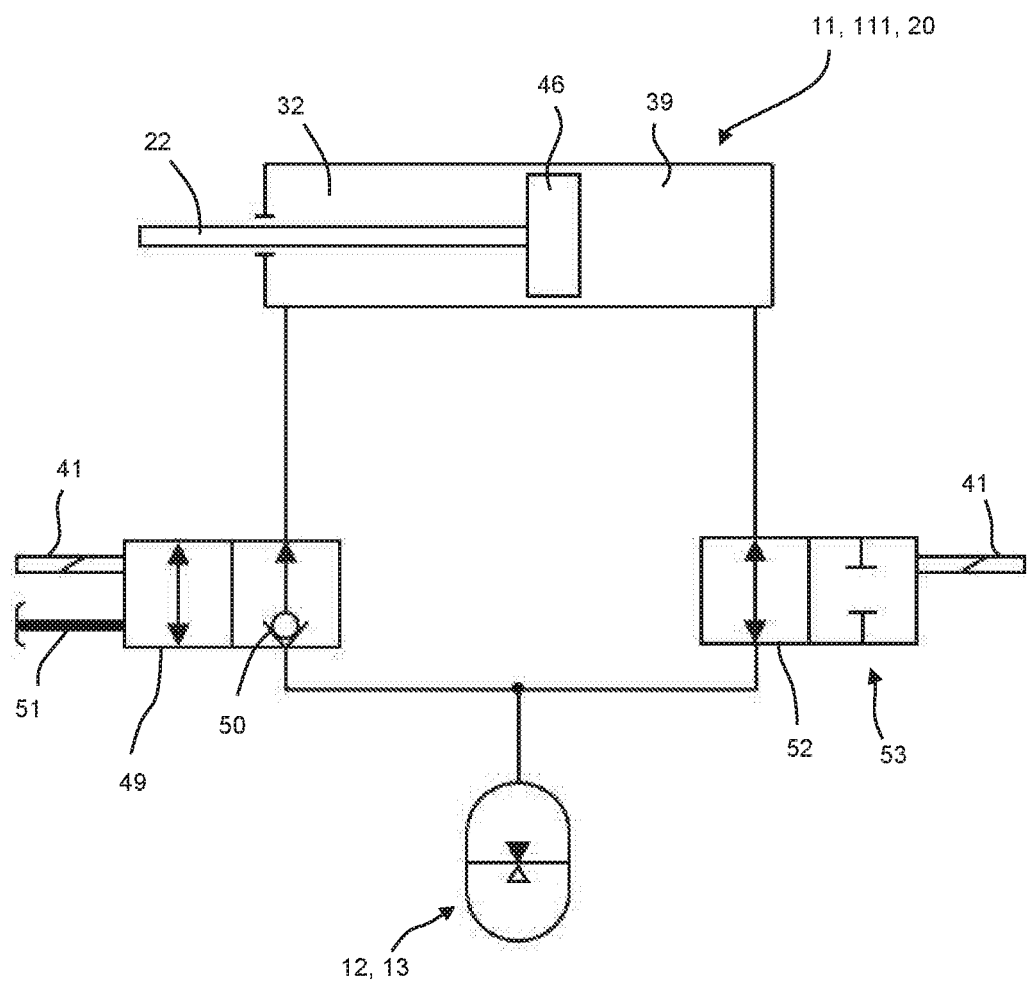
FIG. 3 is a hydraulic circuit diagram for the hydraulic adjuster shown in FIG. 2.

According to the hydraulic circuit diagram shown in FIG. 3, a switching valve 49 configured as a 2/2-way valve is arranged fluidically between the hydraulic accumulator 12 and the piston rod working space 32. In case the respective switching solenoid 41 is not energized, the switching valve 49 assumes the safety position illustrated in FIG. 3, in which a check valve 50 permits a flow from the piston working space 39 of the differential cylinder 20 to its piston rod working space 32, but prevents it in the opposite direction. In this safety position, the restraining bracket 8 can therefore be moved closer to the seat 5, but not further away from it. The switching valve 49 can be switched to its second position by energizing the switching solenoid 41 assigned to the switching valve 49 and in an emergency also by manual actuation using the lever 51. The second position is an unlocked floating position in which both the piston working chamber 39 and the piston rod working chamber 32 of the differential cylinder 20 are pressurized via the line and valve arrangement from the hydraulic accumulator 12, the restraining bracket 8 can be moved manually in the direction of its closed position against the relevant opening force.

The line and valve arrangement also includes a second switching valve 52, also in the form of a 2/2-way valve, which can be actuated by means of an associated switching solenoid 41, which forms a check valve arrangement 53 by means of which hydraulic fluid can be locked in the differential cylinder when the respective switching solenoid is energized, thereby blocking the differential cylinder 20, i.e. fixing the position of the piston rod 22. Due to the resulting fixation of the restraining bracket 8 in its position, especially in its fully open position, the restraining bracket 8 can serve as a boarding aid.

Figure 4:
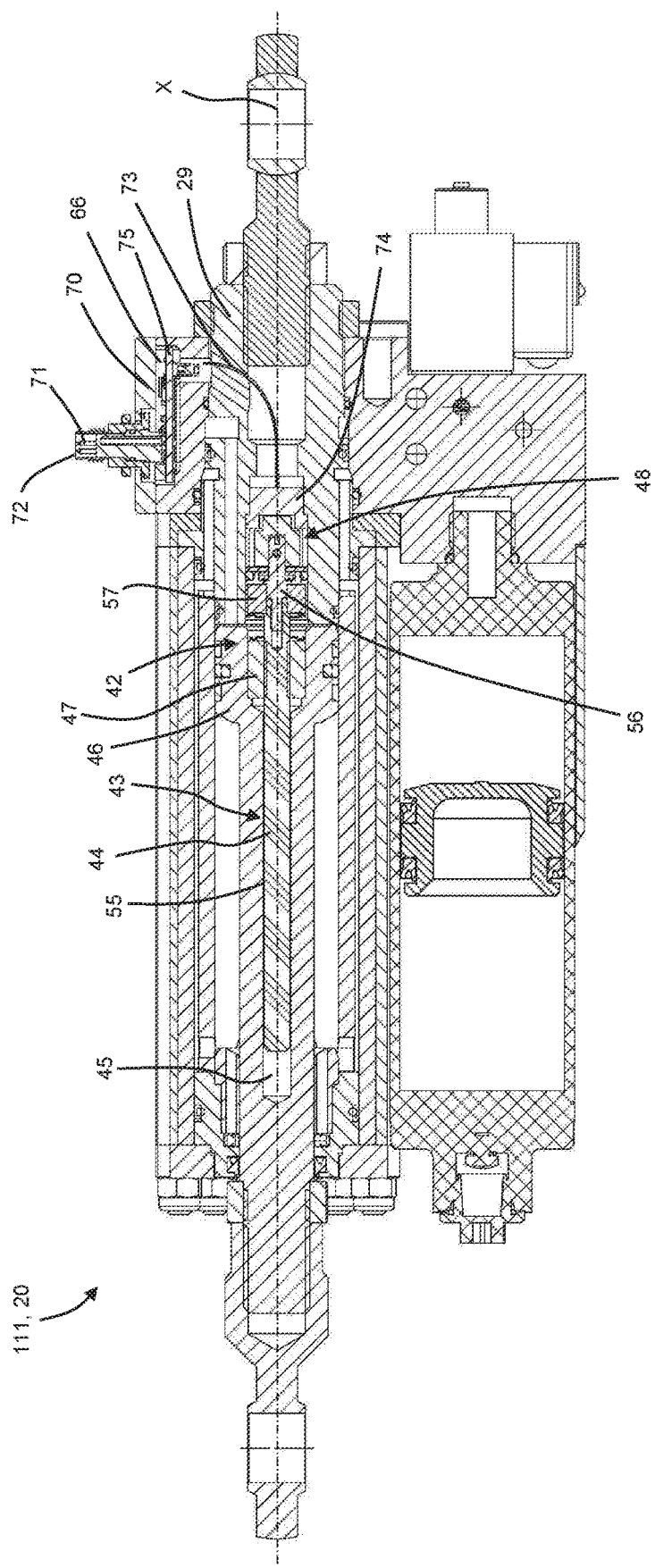
FIG. 4 is a detailed cross section of the hydraulic adjuster used on the passenger restraint device according to a second embodiment.
Figure 5:
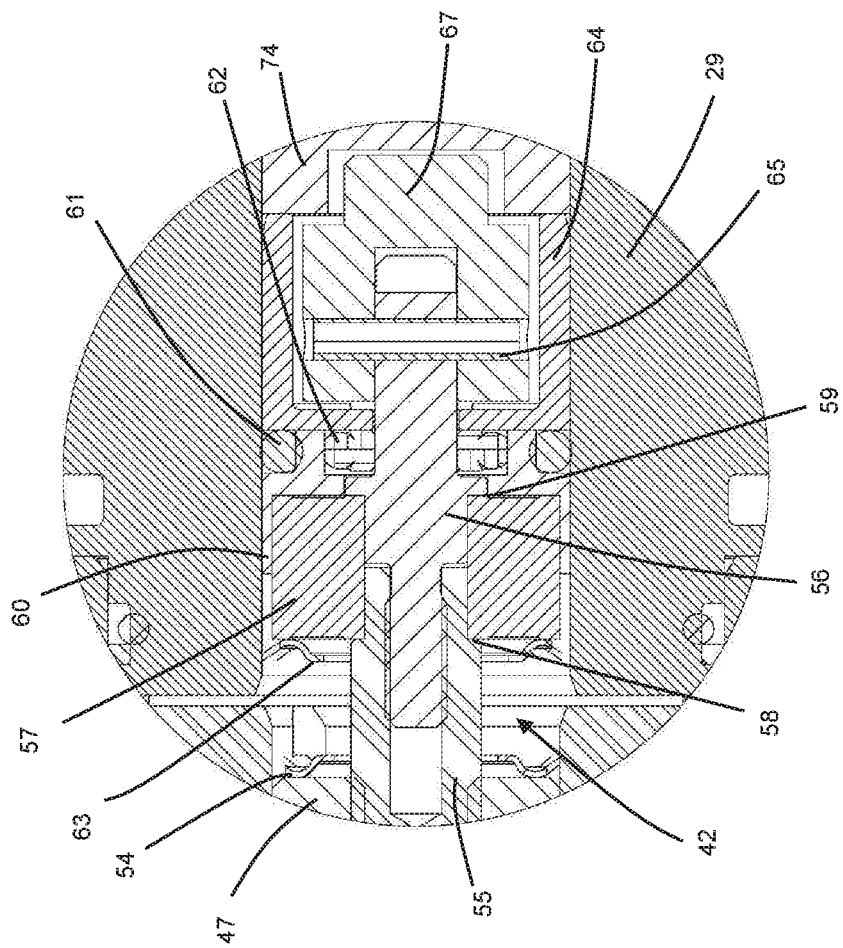
FIG. 5 is an enlarged section from FIG. 4 showing details of the respective hydraulic adjuster.

The second exemplary embodiment illustrated in FIGS. 4 and 5 corresponds to that in FIG. 2 with regard to basic features, so that reference is made to the previous explanations in order to avoid repetitions. However, by implementing several design deviations from the first example shown in FIG. 2 and described above, which are explained below, it is especially designed for applications in which particularly high forces have to be provided in a very compact design.

As shown in FIG. 4 and FIG. 5, the cylinder assembly 21 comprises a cylinder-piston assembly 111 with an integrated piston position sensor 42. It comprises a spindle 43 extending parallel to the cylinder axis X and mounted so as to be axially fixed but rotatable relative to the cylinder 19, with a threaded section 44 having a steep thread, which is extending into a cavity 45 of the piston 46 or the piston rod 22. The threaded section 44 interacts with a corresponding spindle nut 47 located on the piston 46 in such a way that a linear movement of the piston 46 along the cylinder axis X is converted into a rotation of the spindle 43 about its axis. To monitor this spindle rotation, a transducer 48 is disposed in the cylinder 19, namely in its bottom part 29. The signal provided by the transducer 48, which is configured as a non-contact rotary transducer, is transmitted to an electrical control interface connected to it. This is connected to an (not shown) electronic evaluation circuit which is also housed in the circuit board 35 and which also includes a readable operating data memory.

Here the spindle nut 47 is completely accommodated in a bore of the piston 46 and secured there by means of a serrated ring 54. The spindle 43 has two parts. It comprises a main part 55, on the surface of which a steep thread is formed, and an end piece 56 screwed to the main part 55. As far as the bearing of the spindle 43 is concerned, here a (not shown) inner ring of a roller bearing 57 is fixed to the spindle 43 in a transition region between the main part 55 and the end piece 56. In particular, the inner ring of the roller bearing 57 is fixed between a first shoulder 58 provided on the main part 55 and a second shoulder 59 provided on the end piece 56. With regard to the precise and clearance-free support of the spindle 43 in the axial direction and in the radial direction, the roller bearing 57 is configured as a double row ball bearing running under oil. Its outer ring (also not shown) is disposed in a bearing insert 60, which in turn is inserted into a bore of the base part 29 and sealed off from it by means of a sealing ring 61. The bearing insert 60 is sealed against the end piece 56 of the spindle 43 by means of a sealing ring 62. The composite of roller bearing 57 and bearing insert 60 is stayed against a bushing 64 by means of a serrated ring 63, the bushing 64 in turn exists stationary part or sensor 74 of a encoder 48.

In the region of the end piece 56 passing through the bushing 64 the rotary part 67 of the sensor (encoder) 48 is fixed. As shown, the rotary part 67 is fixed by means of a pin 65, which passes through the rotary part 67 and bushing 64.

As can be seen in FIG. 4, an electronic evaluation circuit 75 is disposed in a receptacle space 66 in the switching plate 35. A signal interface 72, configured as contact socket 71, is attached to the cover 70 which closes it. The electronic evaluation circuit 75 is connected via the signal line 73 to the stationary part 74 of the transducer 48.

LIST OF REFERENCE SIGNS 1 passenger space
2 passenger restraint device
3 base structure
4 seat carrier
5 seat
6 restraint element
7 joint
8 restraining bracket
9 pressure plate
10 hydraulic adjuster
11, 111 cylinder-piston unit
12 hydraulic accumulator
13 spring-piston accumulator
14 cylinder
15 piston
16 spring chamber
17 hydraulic chamber
18 gas chamber
19 cylinder
20 differential cylinder
21 cylinder assembly
22 piston rod
23 cylinder housing
24 closure cover
25 connection block
26 outer tube
27 inner tube
28 head part
29 bottom part
30 annular space
31 bore
32 piston rod working space
33 tube portion
34 and plate
35 switching plate
36 channel
37 transfer
38 channel
39 piston working chamber
40 switching interface
41 switching solenoid
42 piston position sensor
43 spindle
44 threaded section
45 cavity
46 piston
47 spindle nut
48 encoder
49 switching valve
50 check valve
51 lever
52 switching valve
53 check valve arrangement
54 serrated ring
55 main part
56 end piece
57 roller bearing
58 first shoulder
59 second shoulder
60 bearing insert
61 sealing ring
62 sealing ring
63 serrated ring
64 bushing
65 pin
66 receptacle space
67 rotary part
68 threading
69 seal member
70 cover
71 contact socket
72 signal interface
73 signal line
74 sensor
75 evaluation circuit
77 filling connection
79 check ball
80 filling nozzle
81 insert
82 primary sealing element
83 secondary sealing element
84 screw plug
85 oil side
86 double-tube profile
87 tube portion

The invention claimed is:

1. A passenger restraint device for a fairground ride passenger unit having a passenger space, the passenger restraint device comprising:
   a position-adjustable restraint element; and
   a lockable hydraulic adjuster acting on the restraint element, the lockable hydraulic adjuster comprising;
   a cylinder-piston unit having a cylinder and a piston; and
   a hydraulic accumulator having a cylinder;
   the hydraulic accumulator and the cylinder-piston unit forming a structural unit with the cylinder of the hydraulic accumulator arranged next to and parallel to the cylinder of the cylinder-piston unit as part of an integrated cylinder assembly;
   the integrated cylinder assembly further comprising a connection block with a switching plate on a axial end face; and the hydraulic accumulator being configured as a single unit which is detachably mounted on the switching plate, so that the entire hydraulic accumulator can be mounted on the switching plate or detached therefrom as a single unit.

2. The passenger restraint device according to claim 1, wherein the hydraulic accumulator is detachably mounted on the switching plate via a threading.

3. The passenger restraint device according to claim 1, wherein the integrated cylinder assembly comprises a portion of an extruded double-tube profile, wherein the hydraulic accumulator is guided in a tube portion of the double-tube profile.

4. The passenger restraint device according to claim 1, wherein the switching plate comprises a line and a valve arrangement hydraulically interconnecting the hydraulic accumulator with the cylinder-piston unit, wherein the switching plate comprises an electrical switching interface.

5. The passenger restraint device according to claim 1, wherein the hydraulic accumulator is a spring accumulator with a hydraulic space and a spring space, the hydraulic space of the hydraulic accumulator being arranged adjacent to the switching plate and the spring space of the hydraulic accumulator being arranged remote from the switching plate.

6. The passenger restraint device according to claim 5, wherein the spring space is as a gas chamber filled with spring gas, wherein the hydraulic accumulator comprises an integrated filling connection for filling the gas chamber with spring gas.

7. The passenger restraint device according to claim 6, wherein the filling connection comprises two-stage sealing.

8. The passenger restraint device according to claim 4, wherein the cylinder-piston unit is a differential cylinder having a piston working space and a piston rod working space, wherein in an unlocked floating position, both the piston working space and the piston rod working space are pressurized by the hydraulic accumulator via the line and valve arrangement.

9. The passenger restraint device according to claim 8, wherein the line and valve arrangement comprises at least one check valve which, in a safety position, permits flow from the piston working space of the differential cylinder to the piston rod working space thereof but prevents flow in an opposite direction.

10. The passenger restraint device according to claim 8, wherein the differential cylinder comprises a piston rod, wherein the line and valve arrangement comprises a check valve arrangement which, in a blocking position, locks hydraulic fluid in the differential cylinder when the piston rod of the differential cylinder is extended.

11. The passenger restraint device according to claim 1, wherein the lockable hydraulic adjuster comprises a piston position sensor assigned to the cylinder-piston unit.

12. The passenger restraint device according to claim 11, wherein the piston position sensor has a spindle which extends parallel to a cylinder axis of the cylinder-piston unit and which is mounted so as to be axially fixed but rotatable relative to the cylinder of the cylinder-piston unit, the spindle having a threaded portion with a steep thread extending into a cavity of a piston of the cylinder-piston assembly and/or of a piston rod, the spindle interacting with a corresponding spindle nut arranged on the piston and/or the piston rod respectively.

13. The passenger restraint device according to claim 11, wherein the spindle is constructed in two parts with a main part having the threaded portion and an end piece connected thereto.

14. The passenger restraint device according to claim 13, wherein an inner ring of a rolling bearing running under oil is fixed to the spindle in a transition region between the main part and the end piece.

15. The passenger restraint device according to claim 14, wherein an outer ring of the roller bearing is disposed in a bearing insert which in turn is inserted into a bore of a bottom part of the cylinder of the cylinder-piston unit, the bearing insert being sealed by means of two sealing rings with respect to the bore of the bottom part accommodating it and with respect to the end piece of the spindle.

16. The passenger restraint device according to claim 11, wherein the lockable hydraulic adjuster comprises an electronic evaluation circuit communicating with the piston position sensor.

17. A passenger unit comprising a passenger space and a passenger restraint device according to claim 1.

18. The passenger restraint device according to claim 16, wherein the electronic evaluation circuit further communicates with an operating data memory communicating with the piston position sensor.

19. The passenger restraint device according to claim 11, wherein the lockable hydraulic adjuster comprises an electronic evaluation circuit communicating with an operating data memory communicating with the piston position sensor.

* * * * *